(12) United States Patent
Harding (10) Patent No.: US 7,428,205 B2
(45) Date of Patent: Sep. 23, 2008

(54) MULTI-LAYER HOLOGRAPHIC DATA READING METHOD

(75) Inventor: Kevin George Harding, Niskayuna, NY (US)

(73) Assignee: General Electric Company, Niskayuna, NY (US)

(*) Notice: Subject to any disclaimer, the term of this patent is extended or adjusted under 35 U.S.C. 154(b) by 1223 days.

(21) Appl. No.: 10/065,882

(22) Filed: Nov. 27, 2002

(65) Prior Publication Data

US 2004/0103136 A1 May 27, 2004

(51) Int. Cl.
*G11B 7/00* (2006.01)

(52) U.S. Cl. ...................................... 369/103

(58) Field of Classification Search ............ None
See application file for complete search history.

(56) References Cited

U.S. PATENT DOCUMENTS

| | | | |
|---|---|---|---|
| 3,767,285 A | | 10/1973 | Mezrich |
| 4,256,362 A | * | 3/1981 | Bardos .................. 359/29 |
| 5,339,305 A | * | 8/1994 | Curtis et al. ............ 369/103 |
| 5,377,176 A | | 12/1994 | Redfield ................ 369/103 |
| 5,377,179 A | | 12/1994 | Redfield ............... 369/275.1 |
| 5,477,347 A | | 12/1995 | Redfield .................. 359/3 |
| 5,519,517 A | | 5/1996 | Redfield et al. ........... 359/22 |
| 5,519,651 A | | 5/1996 | Redfield ................ 365/125 |
| 5,621,549 A | | 4/1997 | Redfield ................ 359/24 |
| 5,719,691 A | * | 2/1998 | Curtis et al. ............ 359/11 |
| 5,793,974 A | * | 8/1998 | Messinger ............... 709/224 |
| 5,877,875 A | * | 3/1999 | Reis et al. ............... 359/22 |
| 6,191,875 B1 | | 2/2001 | Curtis et al. |
| 6,452,890 B2 | * | 9/2002 | Kawano et al. ......... 369/110.01 |
| 2002/0015376 A1 | | 2/2002 | Liu et al. |
| 2002/0136143 A1 | * | 9/2002 | Edwards ................. 396/103 |
| 2002/0163873 A1 | * | 11/2002 | Kawano et al. .......... 369/103 |

OTHER PUBLICATIONS

J.T. LaMacchia and D.L. White, "Coded Multiple Exposure Holograms," Jan. 1968, Applied Optics, vol. 7, No. 1, pp. 91-94.*
John R. Wuller II and Peter J. Delfyett, "Multiwavelength, Multilevel Optical Storage Using Dielectric Mirrors," Sep. 1994, IEEE Photonics Technology Letters, vol. 6, No. 9, pp. 1133-1135.*
Fowles, Grant R., "Introduction to Modern Optics, 2nd Edition," 1989, Dover Publications, pp. 59-63.*

(Continued)

*Primary Examiner*—Joseph Feild
*Assistant Examiner*—Christopher R Lamb
(74) *Attorney, Agent, or Firm*—Shawn A. McClintic (57) ABSTRACT

A plurality of holographic recording media are positioned one above the other on an optical substrate and contain conventional stationary or moving imagery or data sets such as binary data representative of for example written text. A plurality of memory address access media are alternately interleaved between the plurality of holographic recording media. The memory access media causes a pair of optical beams to create an interference pattern at particular hologram recording media layers causing that layer to be read out. The specific memory access media layer is selected by means of scanning the interference pattern spatially within the interrogation beam, or by means of scanning the interrogation beam in wavelength.

7 Claims, 11 Drawing Sheets

OTHER PUBLICATIONS

Homan, S et al: "High-capacity optical storage using multiple wavelengths, multiple layers and volume holograms", Electronics Letters, IEE Stevenage, GB, vol. 31, No. 8, Apr. 13, 1995, pp. 621-623, XP006002721, ISSN: 0013-5194.

International Search Report, PCT/US 03/37853, Jun. 18, 2004.

Rahn, et al. "Digital holographic data storage in a high-performance photorefractive polymer composite". Jul. 10, 2001/ vol. 40, No. 20/ Applied Optics pp. 3395-3401.

Barachevsky, V.A. "Organic Storage Media for Holographic Optical Memory: State-of-the-art and Future". SPIE vol. 4149 (2000) pp. 205-212.

Levi, et al. "Holographic Storage in conjugated-polymer composites" Physical Review B, Condensed Matter and Materials Physics Third Series, vol. 57, No. 20, May 15, 1998-II. 4 pages.

* cited by examiner

MULTI-LAYER HOLOGRAPHIC DATA READING METHOD

BACKGROUND OF INVENTION

This invention relates to multi-layer holographic memory devices and, more specifically to a method of optically addressing memory locations within such devices.

New data storage techniques require high data densities and high access speeds, e.g. greater than 30 Megabits per second (Mb/s). Purely volumetric approaches have been attempted but require very specialized materials that suffer from instability and may require low operating temperatures. In addition, holographic storage has been attempted using crystals and photopolymers, but the volume requirements and addressability have kept these solutions from being practical for fast use. Thus, there remains a need in the art for a system and method for fast and accurate holographic data storage and retrieval.

SUMMARY OF INVENTION

A holographic memory device comprises a plurality of holographic recording media positioned one above the other and a plurality of memory address access alternately interleaved between the plurality of holographic recording media. A readout method uses an interference effect to select out specific vertical memory locations within the plurality of holographic recording media layers.

DETAILED DESCRIPTION

Figure 1:
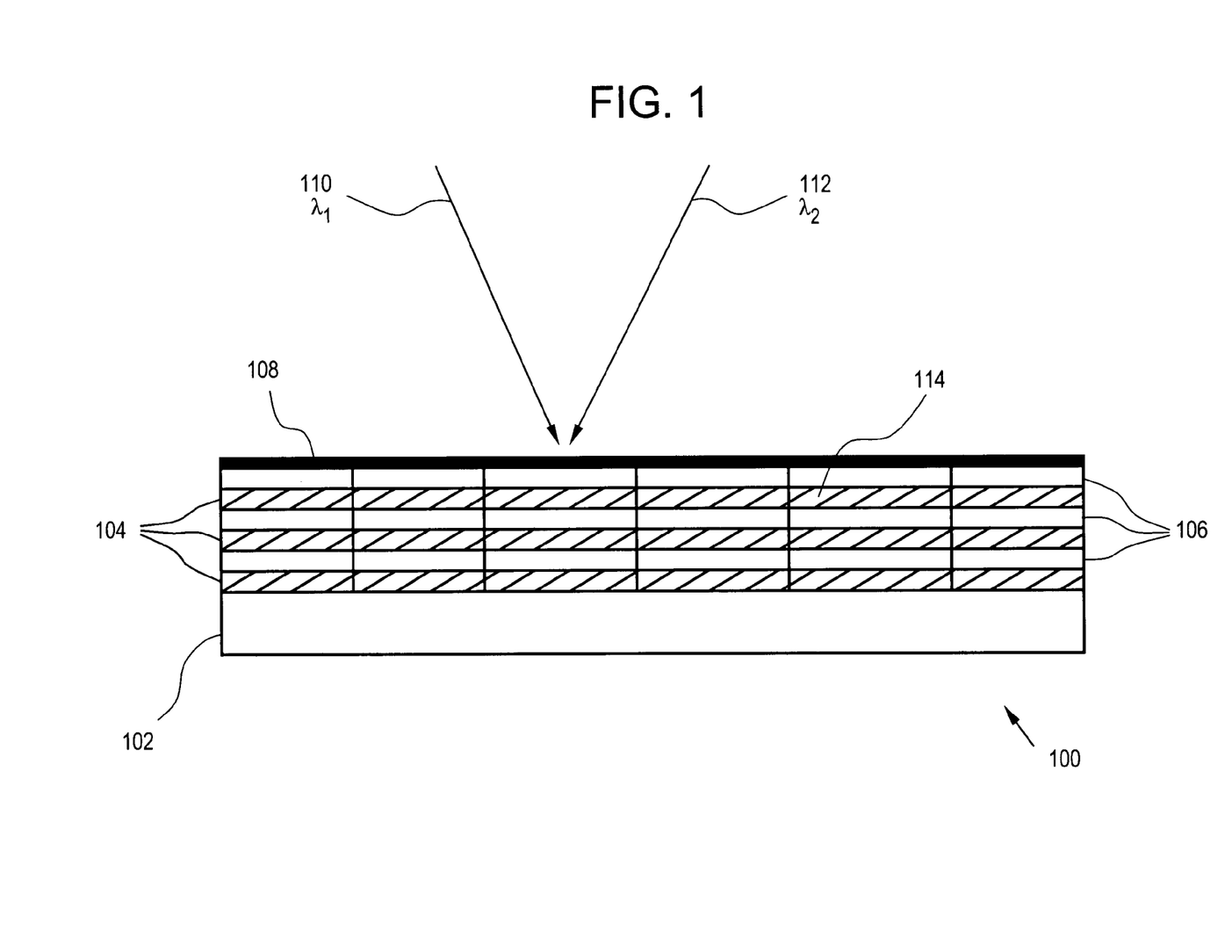
FIG. 1 is a cross section of a holographic memory device having a plurality of holographic layers and phase select layers.

In FIG. 1 a holographic memory device 100 is shown. The holographic memory device 100 comprises a substrate 102. Positioned on the substrate 102 is a plurality of holographic recording media 104. Alternately interleaved between the plurality of holographic recording media 104 is a plurality of memory address access media 106. The holographic memory device 100 may also include a protective layer 108.

Each of the holographic recording media 104 contains therein one or more holograms 114 which may contain holograms of conventional stationary or moving imagery or data sets such as binary data representative of for example written text. Such holograms 114 may be reflection holograms, transmission holograms or computer generated holograms.

Figure 4:
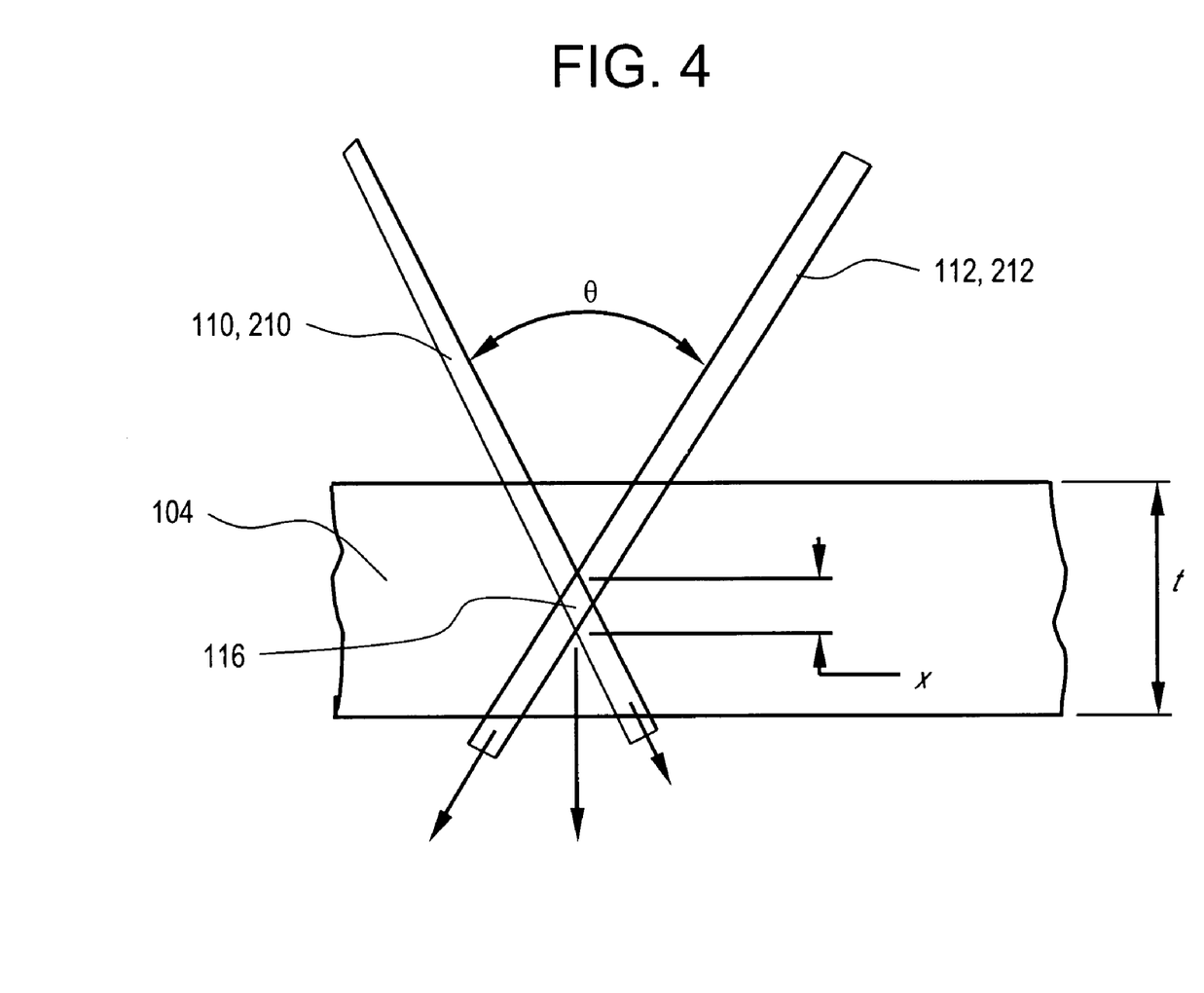
FIG. 4 is a first schematic diagram showing the interference of two optical beams in a holographic layer of the holographic memory devices of FIGS. 1 and 2.
Figure 5:
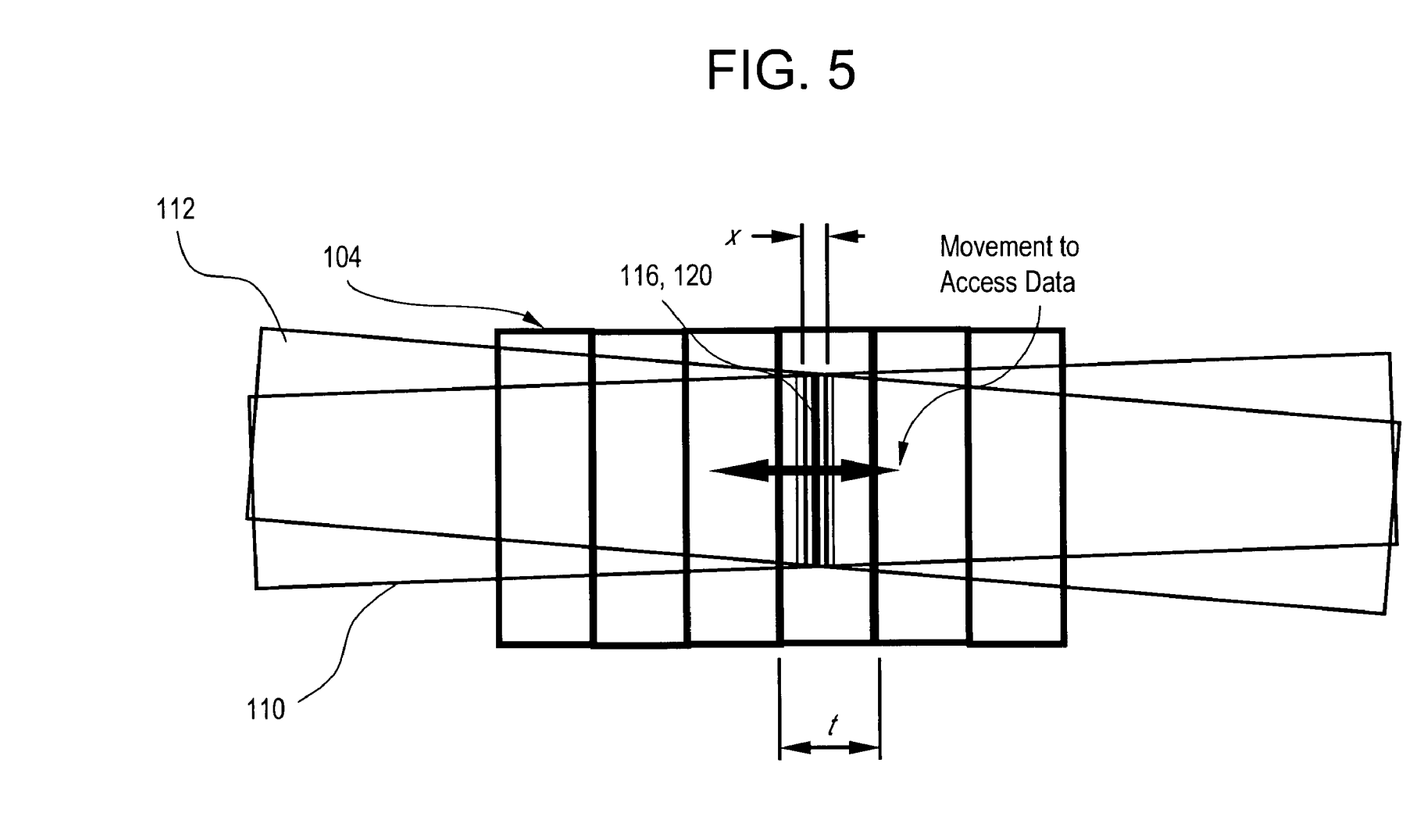
FIG. 5 is a second schematic diagram showing the interference of two optical beams in a holographic layer of the holographic memory devices of FIGS. 1 and 2.
Figure 6:
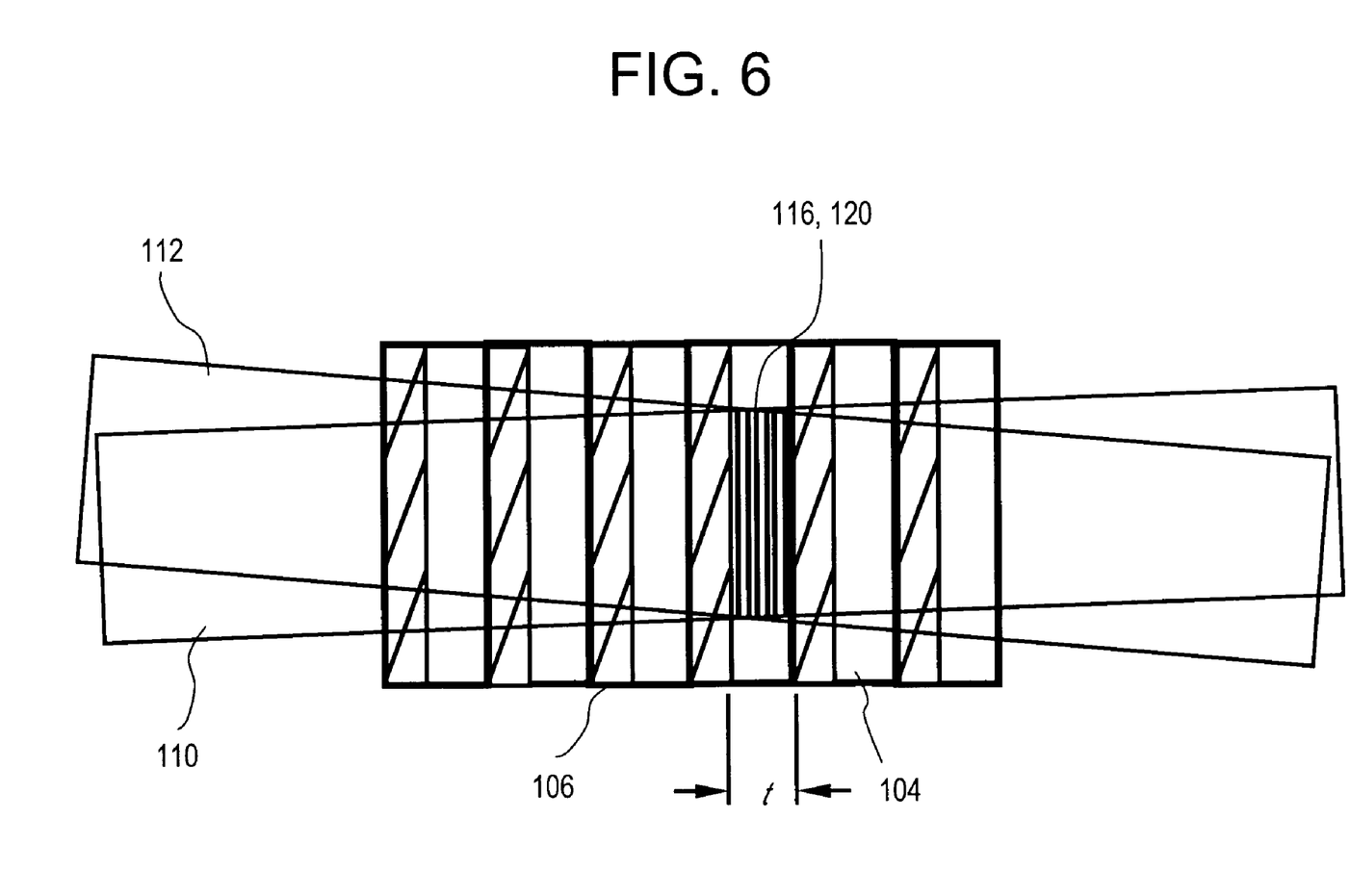
FIG. 6 is a third schematic diagram showing the interference of two optical beams in a holographic layer of the holographic memory devices of FIGS. 1 and 2.
Figure 7:
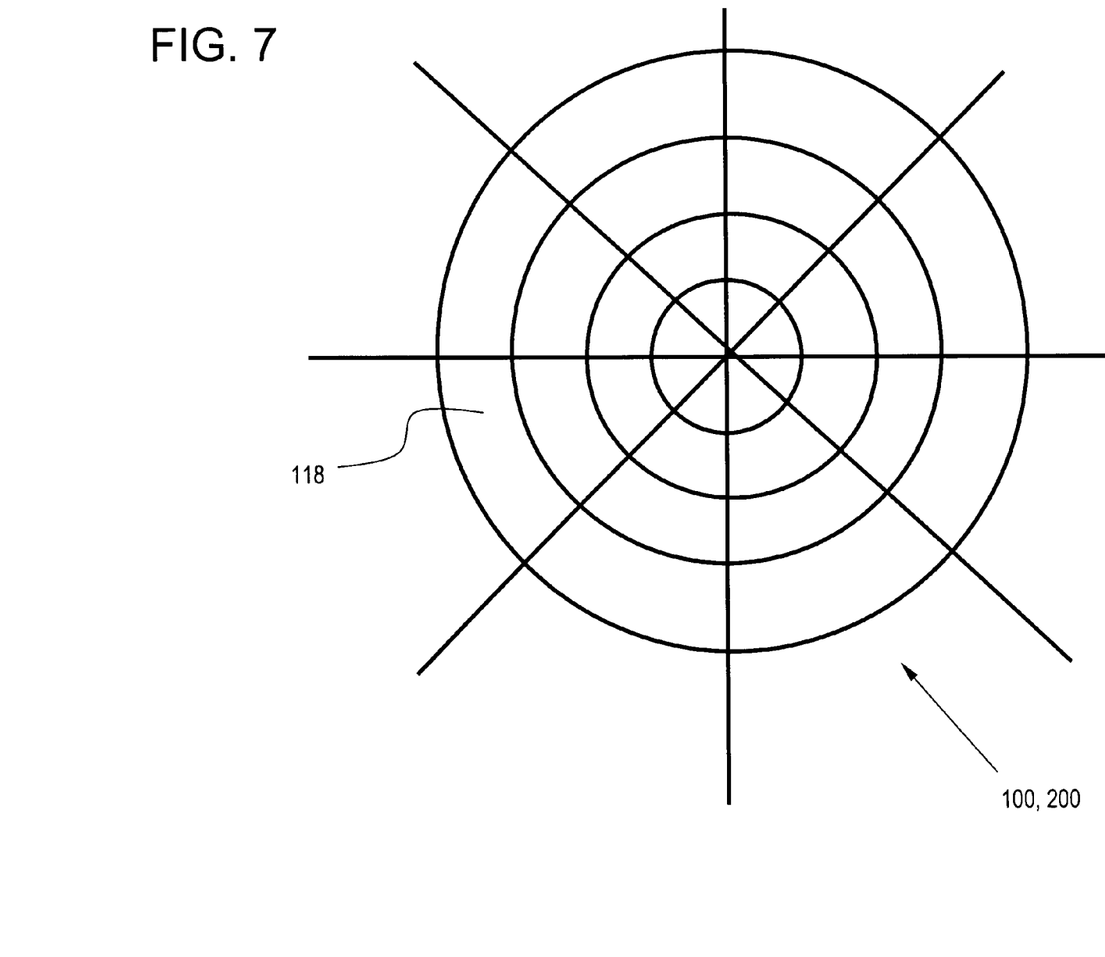
FIG. 7 is a depiction of sector addresses in a holographic memory device.

Thus, by being so vertically interleaved as shown in FIG. 1, each hologram 114 possesses a vertical address within a memory location. The memory address also includes a sector address as is well known in the art. In order to access the vertical memory address of a chosen hologram two optical beams 110, 112 having slightly different wavelengths ($\lambda 1$, $\lambda 2$) are made to interfere at an appropriate sector address 118 (FIG. 7). The interference of the two optical beams 110, 112 forms an interference pattern 120 within an interference volume, a single dimension, x, of which is shown as an interference layer 116 in FIGS. 4 and 5. Beyond the interference layer 116, no interference pattern exists. If the depth, x, of the interference layer 116 is sufficiently small compared to the thickness, t, of each layer of holographic recording media 114 (e.g.; x<<t as in FIG. 5) so as to preclude cross talk to between adjacent layers 104, it will be understood that the memory address access media layer 106 can be made optically thin, or eliminated while maintaining discrete holographic recording media layers 104. In FIG. 6 the interference layer extends for the full thickness of the holographic layer 104. The thin interference layer 116 can be formed, for example, by using an extended light source or a light source with a broad spectral content. By being at slightly different wavelengths, the interference pattern 120 within the interference layer 116 created by the two optical beams 110, 112 will progress in location over time so as to create a continuously moving interference pattern 120 that will progress through subsequent levels of the vertical layers of the holographic recording medium 104. This wavelength sweep method of readout has the advantage that a continuous readout sweep is made through the layers of the holographic media 104 that can be made very fast.

Figure 3:
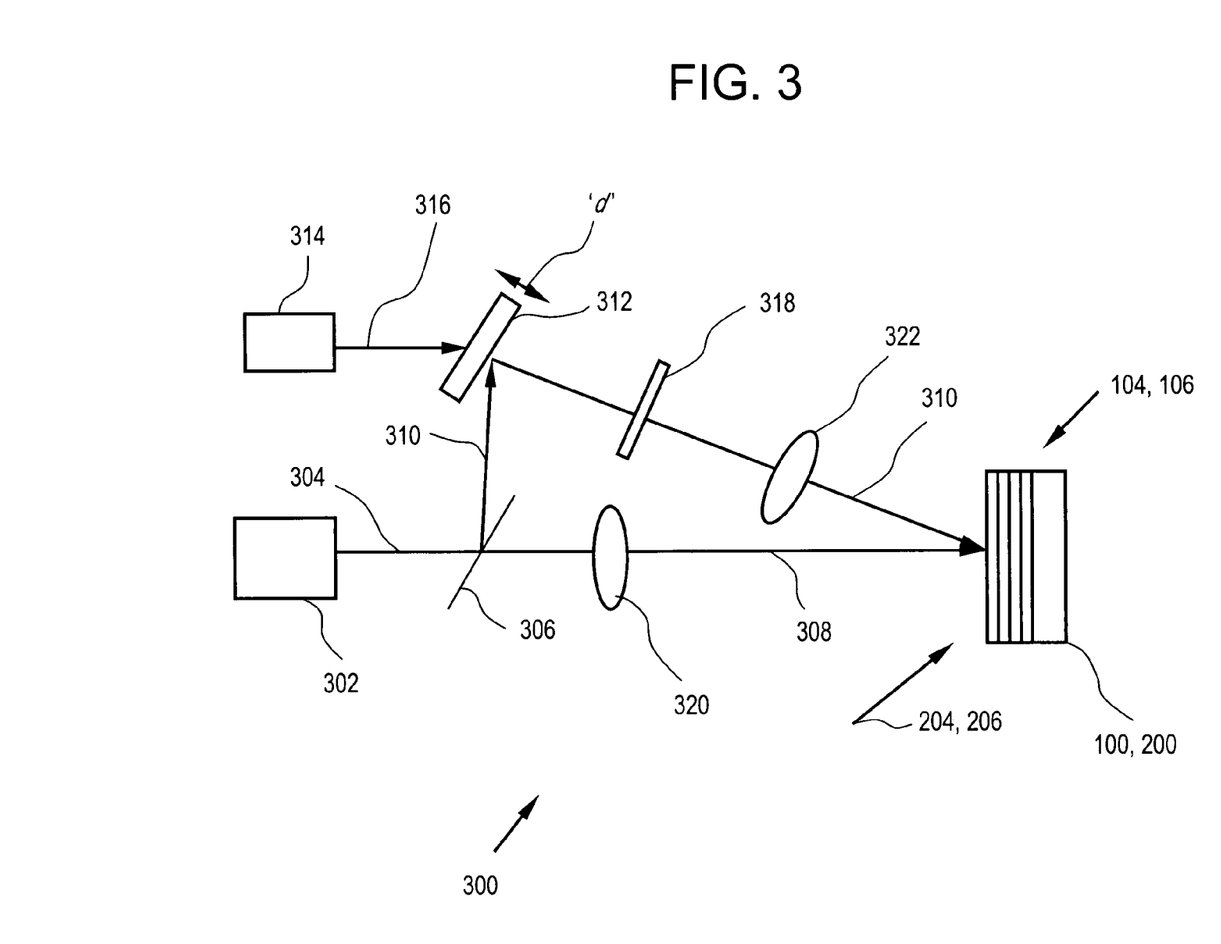
FIG. 3 is a depiction of the optical arrangement for reading holograms.

Alternately, the two optical beams 110, 112 can be of the same wavelength, and means to vary the optical path length, L, in one of the beams can be used to cause the interference layer 116 to progress vertically in a controlled manner rather than in a continuous fast sweep. The optical path length, L, can be changed by using, for example, an electro-optic crystal, or piezoelectric mirror 312 (FIG. 3). This method of moving the interference layer 116 by changing the optical path length, L, has the advantage of providing random addressability of the media layers 104.

Referring to FIG. 3, there are shown various components of an exemplary embodiment of an optical arrangement for reading the holographic memory device 100, 200. A first light source 314 and a second light source 302 produce the two optical beams. The primary optical beam 316 impinges upon the piezoelectric mirror 312, having a thickness (d). A secondary optical beam 304 impinges upon a beamsplitter 306. A portion of the secondary optical beam 310 is directed to the in piezoelectric mirror 312 and joins the path of the emergent primary optical beam 316. The primary optical beam 316 and the portion oft the of the secondary optical beam 310 are then modulated by a modulator 318 for varying and substantially separating at least one of frequency and state of the primary optical beam 316 from the same property of the secondary optical beam 304. The first optical beam 310 emerges from the modulator 318 and is then focused by a first lens 322 upon an appropriate sector address 118 of the holographic recording media 104. Similarly, the second optical beam is focused by a second lens 320 and directed as a second beam 308 to the appropriate sector address 118 of the holographic recording media 104.

When the phase of the interference pattern 120 created by the interference of the two optical beams 110, 112 matches the phase defined by a prescribed memory address access media 106, the memory access media 106 causes a phase shift in the optical beams 110, 112, thereby causing an interference pattern to be created at the corresponding hologram 114.

Figure 8:
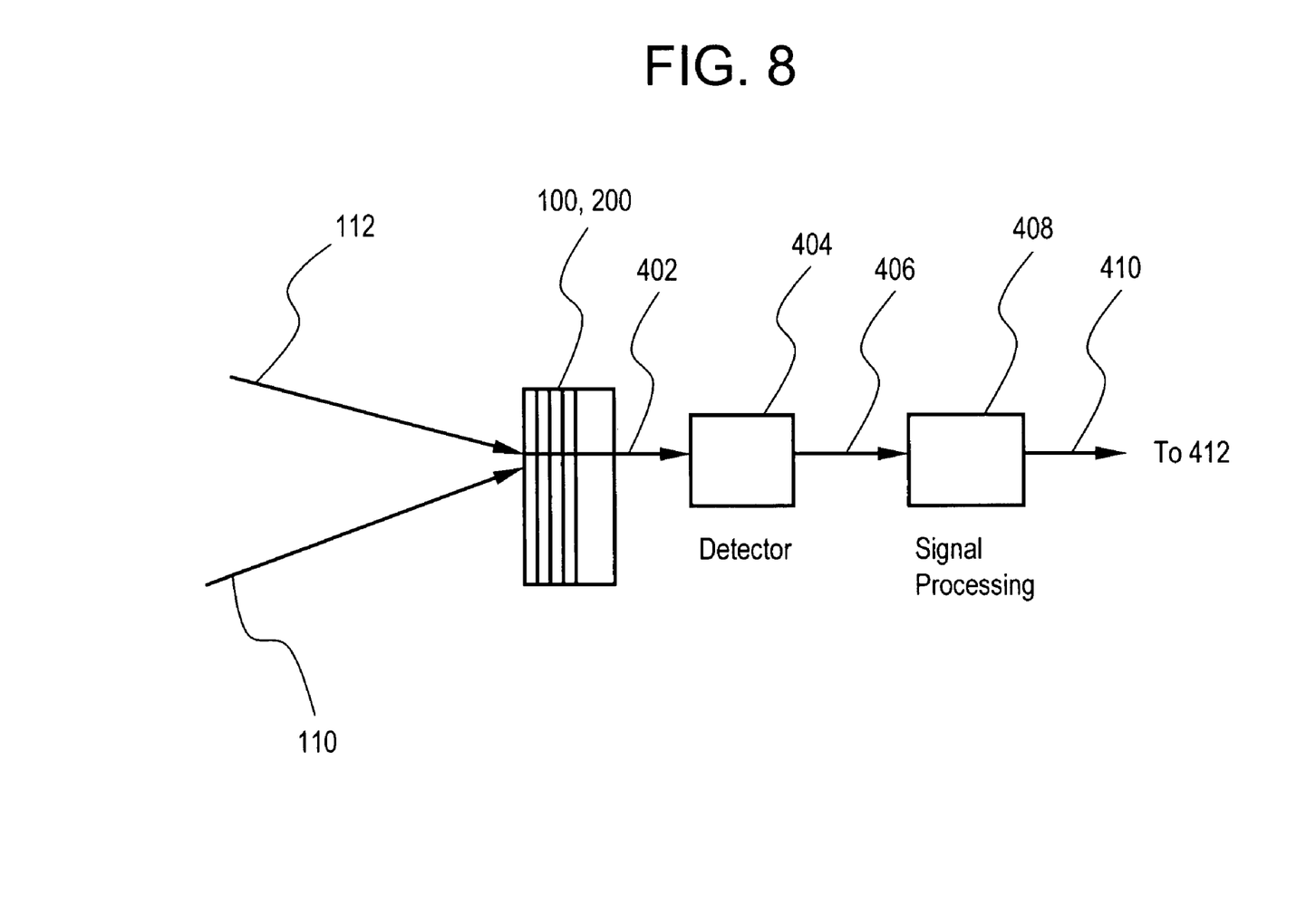
FIG. 8 is a depiction of an optical/electronic arrangement for reading data recorded in a holographic layer of the holographic memory devices of FIGS. 1 and 2.

If the phase of the interference pattern 120 created by the interference of the two beams 110, 112 at a selected hologram 114 is matched to the phase of the hologram recorded at a specific memory location, then a correlation peak will occur and the data contained in the selected hologram 114 may be read out in a manner detectable by an optical detector 404 (FIG. 8). If the phases do not match no correlation peak will occur. The optical detector 404 detects the light diffracted by the hologram, which includes both the correlation peak signal and the holographically stored data signal, and provides as output signal 406 to a signal processing unit 408. The signal processing unit 408 performs a deconvolution operation between the diffracted data from the hologram and the correlation peak signal from the hologram, and provides as output the recorded data 410. If no correlation signal exists no signal is provided by the signal processing unit 408. Spatial or other encoding of the read out pattern can be used to permit the readout signal to be isolated from any noise signals. Spatial or other encoding of the holographic readout can also be used for data security purposes.

Figure 9:
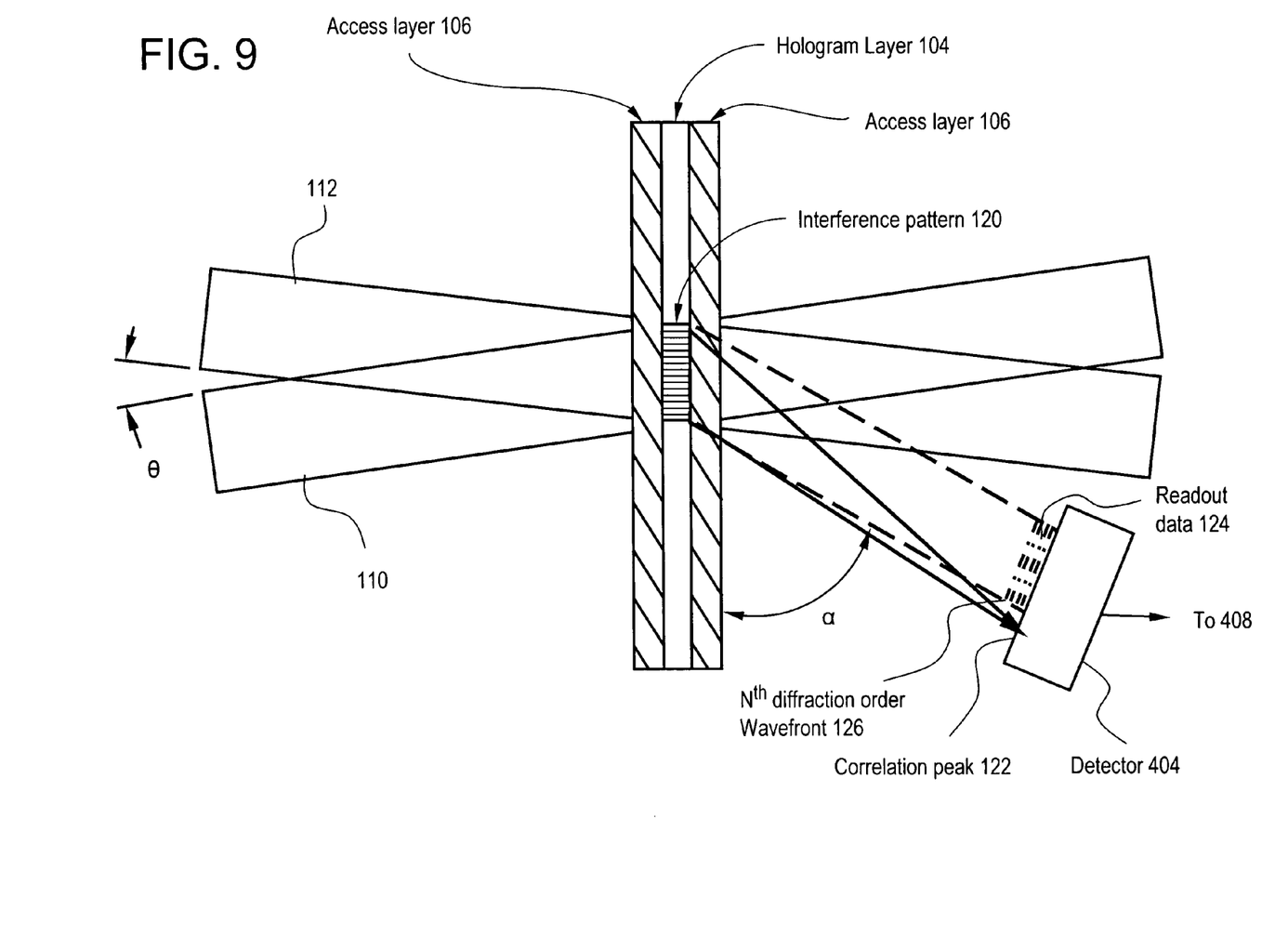
FIG. 9 is a first schematic diagram showing the interference of two optical beams in a holographic layer of the holographic memory devices of FIGS. 1 and 2 generating thereby an $N^{th}$ diffraction order diffracted wavefront.

In FIG. 9, a method of reading a set of data stored in a holographic memory device is shown. A First optical beam 110 is made to interfere with a second optical beam 112 at a prescribed angle, $\theta$, therebetween at a hologram 104 in the holographic memory device. This generates an interference pattern. An $N^{th}$ diffraction order wavefront 126, where N is an integer; is diffracted from the hologram 114 and sensed by the detector 404. The $N^{th}$ diffraction order wavefront 126 includes a correlation peak signal and the holographically stored data. The holographically stored data is correlated with the correlation peak signal. If a correlation peak occurs, deconvolv the holographically stored data and the correlation peak signal are deconvolved and the set of data in the $N^{th}$ diffraction order wavefront 126 is read. The first optical beam 110 and the second optical beam 112 may emanate from an extended light source or a light source with a broad spectral composition, or may emanate from a coherent light source and be at slightly different wavelengths, $\lambda 1$, $\lambda 2$.

Figure 10:
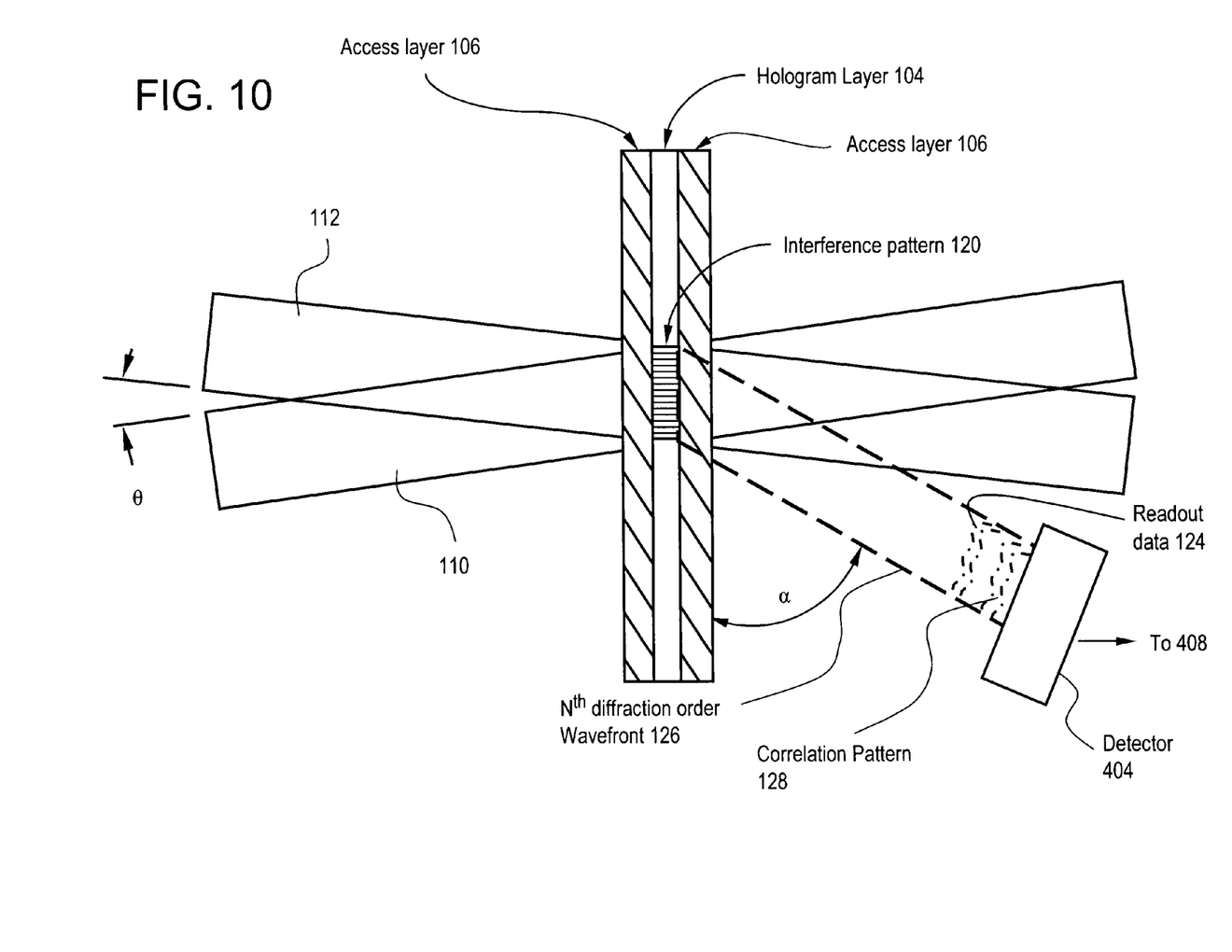
FIG. 10 is a second schematic diagram showing the interference of two optical beams in a holographic layer of the holographic memory devices of FIGS. 1 and 2 generating thereby an $N^{th}$ diffraction order diffracted wavefront.

In FIG. 10, a method of reading a set of data stored in a holographic memory device is shown. A first optical beam 110 is made to interfere with a second optical beam 112 at a prescribed angle, $\theta$, therebetween at a hologram 104 of the holographic memory device. An $N^{th}$ diffraction order wavefront 126, where N is an integer, is diffracted from the hologram 114 and sensed at a detector 404. The $N^{th}$ diffraction order wavefront 126 is correlated with a correlation pattern 128 which includes the set of data. If a correlation peak occurs, the $N^{th}$ diffraction order wavefront 126 and the correlation pattern 128 are deconvolved and the set of data in the $N^{th}$ diffraction order wavefront 126 is read out. The deconvolution can be performed by standard digital image processing methods. The first optical beam 110 and the second optical beam 112 may also emanate from an extended light source or a light source with a broad spectral composition, or may emanate from a coherent light source and be at slightly different wavelengths, $\lambda 1$, $\lambda 2$.

One method of encoding the readout beam so as to match the readout interference pattern (i.e., the interference pattern created by the interference of beams 110 and 112) to the holographic data recorded at a selected holographic recording media layer 114, is to create a specific spatially varying pattern across the readout beam that will beat with the recorded holographic data. The resulting spatial beat pattern is read by the detection system 404, causing the appropriate data to be read out from the holographic recording media 114. Alternately, the information may be read out using a carrier wave pattern imposed on the holographic data or information. When the spatially varying pattern formed in the readout beam matches the pattern encoded in the holographic recording, the holographic data or information is reconstructed and thereby made readable by the detector 404. As a simple example, the hologram might be superimposed on a sinusoidal pattern of a particular frequency. When the two optical beams 110, 112 interfere so as to create a sinusoidal pattern of the same frequency, the memory access media 106 causes a phase shift in the optical beams 110, 112 thereby causing an interference pattern to be created at the corresponding hologram 114 and the data contained therein to be read out. Once the beams 110, 112 have passed through the selected holographic recording media layer 104, they revert to their original non-interfering state by the next access media layer 106, or otherwise no longer exhibit the spatial interference pattern and so do not read any subsequent holograms at different layers. Although specific methods have been described, it is understood that other means for creating an interference pattern at a particular location within the holographic recording media could be substituted to operate in a similar manner without departing from the scope of the invention. Alternate approaches causing the holographic recording to be read out may include matching the angular and wave shape content of the reference beam of the holographic recording.

As best understood from FIG. 1 the holograms 114 at the various vertical locations within the memory may be constructed separate from the holographic memory device 100 or may be constructed while a part of the holographic memory device 100.

Figure 2:
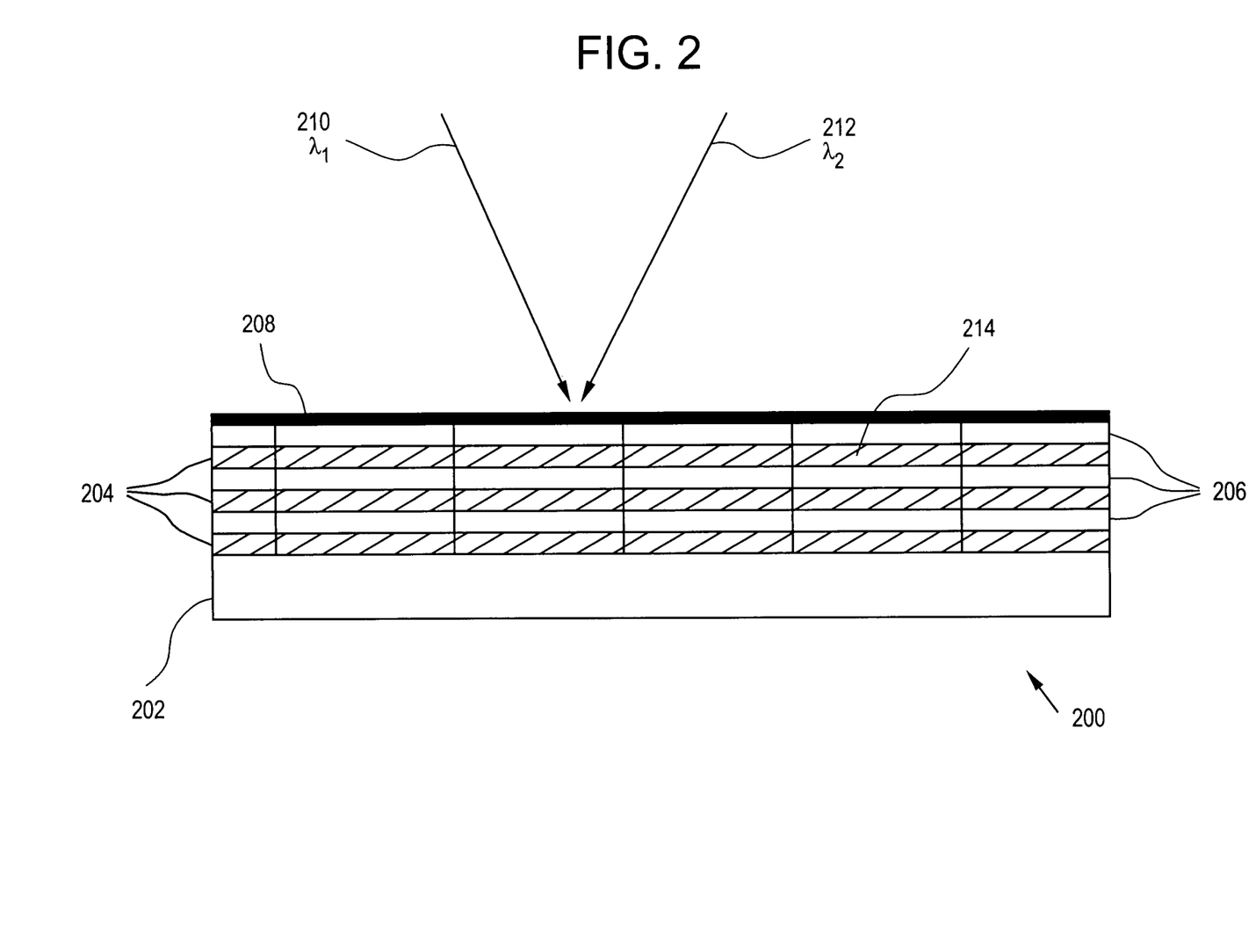
FIG. 2 is a cross section of a holographic memory device having a plurality of holographic layers and polarization select layers.

In FIG. 2, in an alternate embodiment, a holographic memory device 200 is shown. The holographic memory device 200 comprises a substrate 202. Positioned on the substrate 202 is a plurality of holographic recording media 204. Alternately interleaved between the plurality of holographic recording media 204 is a plurality of memory address access media 206. The holographic memory device 200 may also include a protective layer 208.

Each of the holographic recording media 204 contains therein one or more holograms 214 which also may contain holograms of conventional stationary or moving imagery or data sets such as binary data representative of for example written text. Such holograms 214 may be reflection holograms, transmission holograms or computer generated holograms.

Thus, by being so vertically interleaved as shown in FIG. 2, each hologram 214 possesses a vertical memory address within a memory location. The memory address also includes a sector address as is well known in the art. The memory address access media 206 comprise materials which cause polarization retardation of an optical beam of a particular wavelength. It is known that cross polarized optical beams do not interfere. Thus, by controlling the polarization rotation of a pair of optical beams 210, 212, the interference thereof can be controlled to allow the holographic reading of a specific hologram 214. By changing the wavelength of the interfering optical beams 210, 212 different memory address media layers 206 are caused to affect the polarization retardation in the optical beams 210, 212. Thus, by selecting the wavelengths of the beams 210, 212 one selects which memory address media layer 206 changes or shifts the polarization rotation of the optical beams 210, 212. The appropriate hologram memory 214 is addressed. The memory address media layers 206 cause a shift in the polarization of the optical beams 210, 212 whereby the beams 210, 212 are not cross polarized, thus allowing an interference pattern to form at the appropriate hologram 214. If the phase of the interference pattern created by the interference of the two beams 210, 212 at a selected hologram 214 is matched to the phase of the hologram recorded at a specific memory location, then a correlation peak will occur and the data contained in the selected hologram 214 may be read out in a manner detectable by an optical detector 404 (FIG. 6). If the phases do not match no correlation peak will occur.

The interference pattern created by the access media 206 at hologram layer 214 will then beat spatially with the hologram information, or with a carrier wave pattern imposed on the hologram information. This resulting spatial beat pattern is read by the detection system, causing the appropriate data to be read out from the holographic media 214. The light once passed the hologram layer 214 is reverted to its original state by the next access media layer 206.

As best understood from FIG. 2 the holograms 214 at the various vertical locations within the memory may be constructed separate from the holographic memory device 200 or while a part of the holographic memory device 200.

Figure 11:
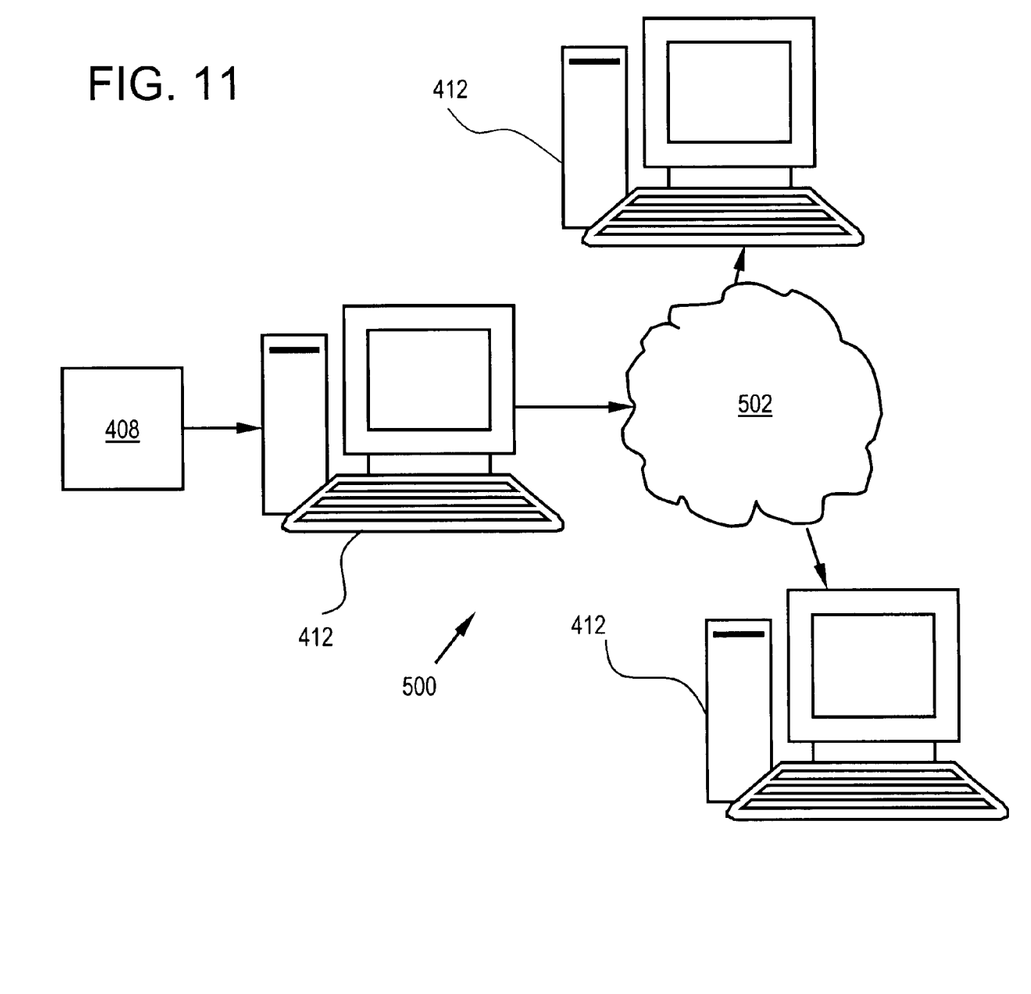
FIG. 11 is a schematic diagram of a computer or communications network in communication with the holographic memory devices of FIGS. 1 and 2.

As seen in FIG. 11, the signal processing unit 408 may be in communication with a network 500 such as a distributed computer or communications network, such as a local area network (LAN) or a wide area network (WAN), a global network (e.g. the Internet) or an intranet 502. The computer network 500 includes at least one personal computer 412 or display device connected to a server from remote geographical locations by wired or wireless connections, by radio based communications, by telephony based communications, or by other network-based communications. The computer 412 or display device may also be connected directly to other like computers or display devices. The computer 412 is in turn similarly connected to other computers 412, display devices or networks through the Internet 502. The computers 412, display devices and other electronic media devices of the networks may be configured to execute computer program software, that allows them to send, receive, record, store and process commands or algorithms between and amongst themselves via the networks and the Internet 502 to read data stored in a holographic memory device. Such processing of the commands or algorithms includes, for example, various types of encryption, decryption, image compression and decompression algorithms, as well as other types of filtering, contrast enhancement, image sharpening, noise removal and correlation for image classification.

Any reference to first, second, etc., or front or back, right or left, top or bottom, upper or lower, horizontal or vertical, or any other phrase indicating the relative position of one object, quantity or variable with respect to another is, unless noted otherwise, intended for the convenience of description, and does not limit the present invention or its components to any one positional, spatial or temporal orientation. All dimensions of the components in the attached Figures can vary with a potential design and the intended use of an embodiment without departing from the scope of the invention.

While the invention has been described with reference to several embodiments thereof, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

The invention claimed is:

1. A method of reading a set of data stored in a memory device, the method comprising:

causing a first optical beam to interfere with a second optical beam at a prescribed angle therebetween at a first selected hologram containing at least a segment of the set of data and having a discrete location and a corresponding address in the memory device, generating thereby an $N^{th}$ diffraction order wavefront;

wherein the first and second optical beams are characterized by a wavelength, an optical path length and a state of polarization;

sensing the $N^{th}$ diffraction order wavefront diffracted from the hologram;

correlating the $N^{th}$ diffraction order wavefront with a correlation pattern which includes the set of data; where N is an integer;

if a correlation peak occurs, deconvolving the $N^{th}$ order wavefront and the correlation pattern;

reading the set of data corresponding to the selected hologram and contained in the deconvolved $N^{th}$ diffraction order wavefront; and, reading the set of data in the $N^{th}$ diffraction order wavefront for a second selected hologram by changing the wavelength of one optical beam with respect to the other.

2. A method of reading a set of data stored in a memory device, the method comprising:

causing a first optical beam to interfere with a second optical beam at a prescribed angle therebetween at a first selected hologram containing at least a segment of the set of data and having a discrete location and a corresponding address in the memory device, generating thereby an $N^{th}$ diffraction order wavefront;

wherein the first and second optical beams are characterized by a wavelength, an optical path length and a state of polarization;

sensing the $N^{th}$ diffraction order wavefront diffracted from the hologram;

correlating the $N^{th}$ order wavefront with a correlation pattern which includes the set of data; where N is an integer;

if a correlation peak occurs, deconvolving the $N^{th}$ diffraction order wavefront and the correlation pattern;

reading the set of data corresponding to the selected hologram and contained in the deconvolved $N^{th}$ diffraction order wavefront; and, reading the set of data in the $N^{th}$ diffraction order wavefront for a second selected hologram by changing the state of polarization of one optical beam with respect to the other.

3. A method of reading a set of data stored in a memory device, the method comprising:

causing a first optical beam to interfere with a second optical beam at a prescribed angle therebetween at a hologram having a discrete location and corresponding address in the memory device generating thereby a interference pattern;

wherein the first and second optical beams are characterized by a wavelength, an optical path length and a state of polarization;

sensing an $N^{th}$ diffraction order wavefront diffracted from the hologram; where N is an integer;

wherein the $N^{th}$ diffraction order wavefront includes a correlation peak signal and the holographically stored data;

correlating the holographically stored data and the correlation peak signal in the $N^{th}$ diffraction order wavefront;

if a correlation peak occurs, deconvolving the holographically stored data and the correlation peak signal;

reading the set of data in the deconvolved $N^{th}$ diffraction order wavefront; and, reading the set of data in the $N^{th}$ diffraction order wavefront for a second selected hologram by changing the wavelength of one optical beam with respect to the other.

4. A method of reading a set of data stored in a memory device, the method comprising:

causing a first optical beam to interfere with a second optical beam at a prescribed angle therebetween at a hologram having a discrete location and corresponding address in the memory device generating thereby a interference pattern;

wherein the first and second optical beams are characterized by a wavelength, an optical path length and a state of polarization;

sensing an $N^{th}$ diffraction order wavefront diffracted from the hologram; where N is an integer;

wherein the $N^{th}$ diffraction order wavefront includes a correlation peak signal and the holographically stored data;

correlating the holographically stored data and the correlation peak signal in the $N^{th}$ diffraction order wavefront;

if a correlation peak occurs, deconvolving the holographically stored data and the correlation peak signal;

reading the set of data in the deconvolved $N^{th}$ diffraction order wavefront; and, reading the set of data in the $N^{th}$ diffraction order wavefront for a second selected hologram by changing the state of polarization of one optical beam with respect to the other.

5. A data storage memory device comprising:

a plurality of recording media containing a set of holographically recorded data at discrete memory locations therein wherein each memory location is identified by a corresponding memory address;

means for creating an interference pattern between two beams of light at a selected one of the discrete memory locations in the recording media, generating thereby an $N^{th}$ diffraction order wavefront;

means for sensing the $N^{th}$ diffraction order wavefront emanating from the selected discrete memory location;

means for reading the holographically stored data from the $N^{th}$ diffraction order wavefront;

wherein the plurality of recording media comprise layered holograms and wherein the interference pattern exists over a dimension less than a thickness of the recording media along the direction of travel of the beams of light.

6. A data storage memory device comprising:

a plurality of recording media containing a set of holographically recorded data at discrete memory locations therein wherein each memory location is identified by a corresponding memory address;

means for creating an interference pattern between two beams of light at a selected one of the discrete memory locations in the recording media, generating thereby an $N^{th}$ diffraction order wavefront; wherein the means for creating an interference pattern between two beams of light comprises a coherent source of light; and wherein the two beams of light are crossed polarized with respect to one another and the means for creating an interference pattern comprises rotating at least one of the beams of light;

means for sensing the $N^{th}$ diffraction order wavefront emanating from the selected discrete memory location; and means for reading the holographically stored data from the $N^{th}$ diffraction order wavefront.

7. A data storage memory device comprising:

a plurality of recording media containing a set of holographically recorded data at discrete memory locations therein wherein each memory location is identified by a corresponding memory address;

means for creating an interference pattern between two beams of light at a selected one of the discrete memory locations in the recording media, generating thereby an $N^{th}$ order wavefront; wherein the means for creating an interference pattern between two beams of light comprises a coherent source of light; and wherein the two beams of light are crossed polarized with respect to one another and the means for creating an interference pattern comprises rotating at least one of the beams of light;

means for sensing the $N^{th}$ diffraction order wavefront emanating from the selected discrete memory location; and means for reading the holographically stored data from the $N^{th}$ diffraction order wavefront;

wherein the plurality of recording access media which cause a change in phase of the two beams of light with respect to one another generating thereby non-cross polarized beams of light.

* * * * *

UNITED STATES PATENT AND TRADEMARK OFFICE
CERTIFICATE OF CORRECTION

PATENT NO. : 7,428,205 B2
APPLICATION NO. : 10/065882
DATED : September 23, 2008
INVENTOR(S) : Harding It is certified that error appears in the above-identified patent and that said Letters Patent is hereby corrected as shown below:

In Column 2, Line 67, after "portion" delete "oft the".

In Column 3, Line 2, after "state" insert -- of polarization --.

In Column 3, Line 7, delete "second" and insert -- secondary --, therefor.

In Column 3, Line 8, delete "second beam" and insert -- second optical beam --, therefor.

In Column 6, Line 32, in Claim 1, delete "$N^{th}$ order" and insert -- $N^{th}$ diffraction order --, therefor.

In Column 6, Line 53, in Claim 2, delete "$N^{th}$ order" and insert -- $N^{th}$ diffraction order --, therefor.

In Column 8, Line 37, in Claim 7, delete "$N^{th}$ order" and insert -- $N^{th}$ diffraction order --, therefor.

Signed and Sealed this

Twenty-fourth Day of February, 2009

JOHN DOLL
*Acting Director of the United States Patent and Trademark Office*